United States Patent Office.

BRUNO TERNE, OF PHILADELPHIA, PENNSYLVANIA, ASSIGNOR OF THREE-FOURTHS TO JOHN P. BAUGH, EDWIN P. BAUGH, AND DANIEL BAUGH, OF SAME PLACE.

TREATMENT OF TANK-WATERS OF SLAUGHTER-HOUSES, &c.

SPECIFICATION forming part of Letters Patent No. 246,242, dated August 23, 1881.

Application filed April 11, 1881. (No specimens.)

*To all whom it may concern:*

Be it known that I, BRUNO TERNE, a citizen of the United States, residing at Philadelphia, Pennsylvania, have invented an Improvement in Treating Tank-Waters of Slaughter-Houses, &c., of which the following is a specification.

My invention relates to the utilizing of tank-waters of slaughter-houses, packing-houses, bone-boiling and other analogous establishments by using the organic matter contained in such waters as a manure ingredient; and my invention consists in combining concentrated tank-water with sulphuric acid, and using the solution as a solvent for phosphatic substances in the manufacture of manures, the organic matter being incorporated with the said substances during the process of dissolving the same.

In carrying out my invention the tank-water, which differs in consistency, as shown by differences in specific gravities, from 1° to 5° Baumé, is concentrated by any known process to an extent which may be varied without departing from the main features of my invention. I may state, however, that a concentration of from 15° to 20° Baumé will be suitable, the aim being to obtain a solution a gallon of which will contain about one-half pound of nitrogenous matter. I mix the concentrated tank-water with sulphuric acid, either chamber-acid or more concentrated acid. If chamber-acid is used, it should be heated and mixed with the concentrated tank-water in a heated state, so as to obtain an intimate admixture; but if a stronger or more concentrated acid is used, the preliminary heating is not necessary, as the acid itself generates sufficient heat to insure a proper admixture of the ingredients. This solution is used for dissolving mineral phosphates, bones, bone-black, bone-ash, or other phosphatic substances which are used in the manufacture of manure, the nitrogenous substances of the tank-waters being thus incorporated with the phosphatic substances, while the latter are being dissolved by the acid solution charged with the concentrated tank-water.

The proportion of acid to the concentrated tank-water will depend upon the desired ammoniacal strength of the resultant manure or manure ingredient. The less acid used the greater will be the ammoniacal strength, and the greater the proportion of acid the less will be the strength. For a phosphate manure or manure ingredient of medium ammoniacal strength the proportion of chamber-acid to the concentrated tank-water may be about one to two parts of the former to one part of the latter.

Blood has been treated with sulphuric acid in the manufacture of manure; but my invention relates to the utilizing of tank-waters or washings of slaughter-houses, packing-houses, and other analogous establishments, and these tank-waters, which are not wholly of blood, and are usually allowed to run to waste, must, in carrying out my invention, be first concentrated before they are subjected to the acid treatment.

I claim as my invention—

A solution for treating phosphatic substances in the manufacture of manures or manure ingredients, the said solution consisting of a combination of concentrated tank-waters of slaughter-houses, packing-houses, bone-boiling and other analogous establishments, mixed with sulphuric acid, as set forth.

In testimony whereof I have signed my name to this specification in the presence of two subscribing witnesses.

BRUNO TERNE.

Witnesses:
JAMES F. TOBIN,
HARRY SMITH.